United States Patent
Quinn et al.

(10) Patent No.: US 7,971,141 B1
(45) Date of Patent: Jun. 28, 2011

(54) METHOD AND SYSTEM FOR POPULATING A FORM BASED ON AN EXISTING FORMAT

(75) Inventors: Chris Quinn, San Diego, CA (US);
Anthony Creed, San Diego, CA (US);
Justin C. Marr, San Diego, CA (US);
Kenichi Mori, Carlsbad, CA (US)

(73) Assignee: Intuit Inc., Mountian View, CA (US)

( * ) Notice: Subject to any disclaimer, the term of this patent is extended or adjusted under 35 U.S.C. 154(b) by 1275 days.

(21) Appl. No.: 11/591,424

(22) Filed: Oct. 31, 2006

(51) Int. Cl.
*G06F 17/00* (2006.01)
(52) U.S. Cl. ............................ 715/721; 715/223; 705/31
(58) Field of Classification Search .......... 715/221–231, 715/764; 705/19, 31
See application file for complete search history.

(56) References Cited

U.S. PATENT DOCUMENTS

| | | | |
|---|---|---|---|
| 2005/0038722 A1* | 2/2005 | Throndson et al. | 705/31 |
| 2007/0033117 A1* | 2/2007 | Murray | 705/31 |
| 2007/0300145 A1* | 12/2007 | Perelman et al. | 715/505 |
| 2010/0153441 A1* | 6/2010 | Lopata et al. | 707/769 |

OTHER PUBLICATIONS

TurboTax for Windows "User's Guide" by Intuit for Tax year 1997 (the whole document pp. 1-61).*

\* cited by examiner

*Primary Examiner* — Doug Hutton
*Assistant Examiner* — Quoc A Tran
(74) *Attorney, Agent, or Firm* — Osha • Liang LLP

(57) ABSTRACT

A method of populating at least one form involving selecting a current completion option based on a previous completion option, obtaining a first completion process based on the current completion option, and populating the at least one form using the first completion process, wherein a format of the first completion process is determined by the selected current completion option.

23 Claims, 4 Drawing Sheets

METHOD AND SYSTEM FOR POPULATING A FORM BASED ON AN EXISTING FORMAT

BACKGROUND

Every year millions of people, companies, and other institutions file various forms with a variety of different entities, including the agencies of local, state, and national governments. These forms may be directed towards financial matters including taxes, inventory, financial accounts, medical reimbursements, etc. In addition, such forms may be related to non-financial activity, such as obtaining support for a purchase item or service, completing forms designated for new patients used by doctors, dentists, or hospitals, etc. Each form may have multiple data fields requiring completion by a user (e.g., an individual, a company, an institution, etc.). For example, in the case of tax forms, a user is required to complete data fields associated with income, mortgage interest, student loans, deductions, etc.

A user may employ the services of an expert to assist in completing and filing a form. For example, in the case of a tax form, a user may employ the services of a tax expert to assist in completing and filing the tax form. The tax expert may be required to gather the appropriate financial information from the user and from financial records (e.g., W-2 forms, bank statements, receipts, etc.) to complete the tax form. The order in which the tax expert completes the financial form and/or the order in which the tax expert gathers financial information to complete the financial form may be of a specific format.

A user may also employ a software package to assist in completing and filing a form. The software package may be used to ensure that the data provided to complete a form is accurate and complies with standard regulations. The software package may separate the financial form into sections, request data using an interview process, and perform automatic calculations of different fields within the form. Like the case of an expert, the order in which the software package gathers data and the order in which the software package gathers information to complete the form may be of a specific format.

SUMMARY

In general, in one aspect, the invention relates to a method of populating at least one form comprising selecting a current completion option based on a previous completion option, obtaining a first completion process based on the current completion option, and populating the at least one form using the first completion process, wherein a format of the first completion process is determined by the selected current completion option.

In general, in one aspect, the invention relates to a computer readable medium storing instructions to populate at least one form, the instructions comprising functionality to select a current completion option based on previous completion option, obtain a first completion process based on the first completion option, and populate the at least one form using the first completion process, wherein a format of the first completion process is determined by the selected current completion option.

In general, in one aspect, the invention relates to a system for populating at least one form comprising a software package configured to obtain a current completion option selected by a user, wherein the current completion option is selected based on a previous completion option, a completion process generator configured to generate a completion process associated with the current completion option, wherein a format of the completion process is determined by the current completion option, and a form repository comprising the at least one form, wherein the at least one form is populated using the completion process.

Other aspects of the invention will be apparent from the following description and the appended claims.

DETAILED DESCRIPTION

Figure 1:
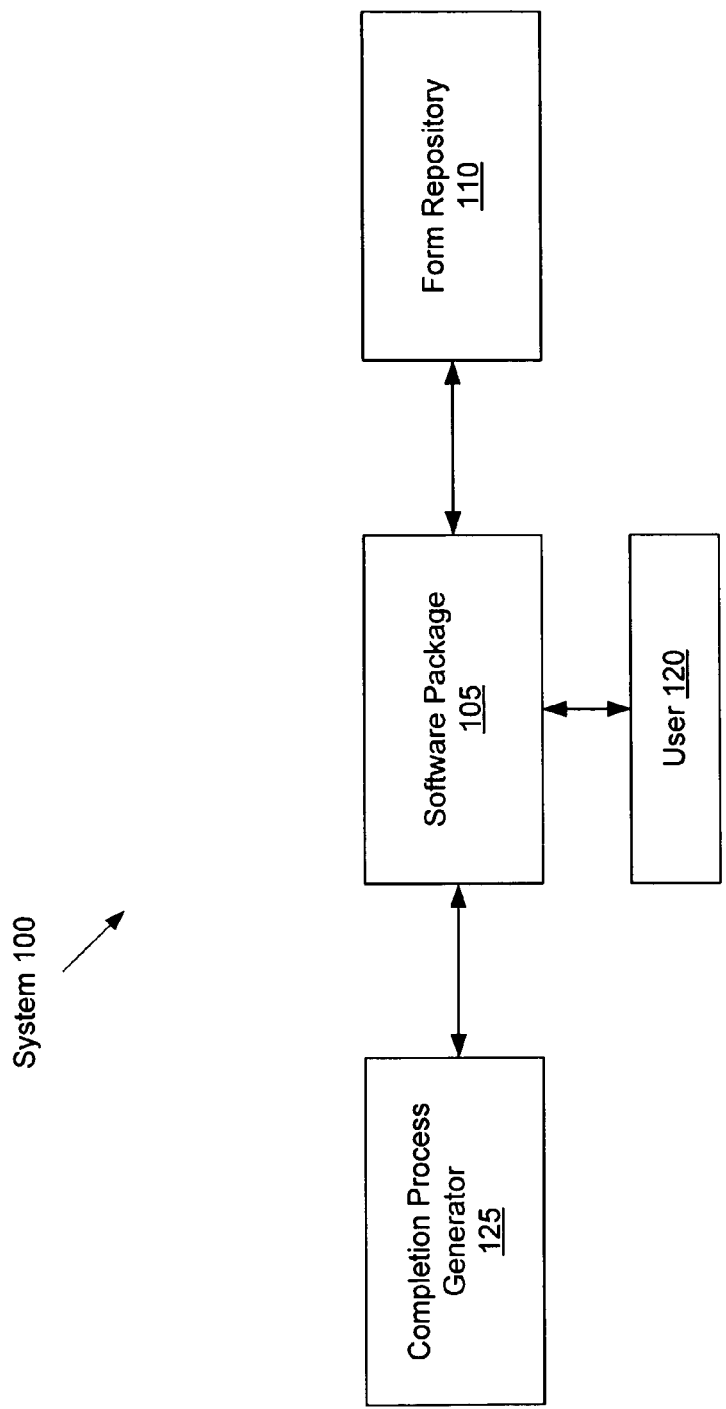
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for populating a form based on an existing format. More specifically, embodiments of the invention relate to customizing the form filing process based upon a user's previous form filing experience for forms that have a specified content requirements and an expected formatted output.

FIG. 1 shows a system (100) in accordance with one or more embodiments of the invention. As shown in FIG. 1, system (100) includes a software package (105), a form repository (110), a user (120), and a completion process generator (125). Some of these components may be located on the same device (e.g., a server, mainframe, desktop PC, laptop, kiosk, cable box, PDA, telephone, mobile phone, etc.) or may be located on separate devices communicating via a network (e.g., the Internet), with wired and/or wireless segments. Each of the aforementioned components are described below.

In one or more embodiments of the invention, the software package (105) is used to customize the form filing process for a user (120). This process of viewing, populating, and filing form(s) may be referred to as a completion process. Viewing the form(s) involves opening the forms in a format consistent with a form issued by entities, such as the Internal Revenue Service (IRS) or other governmental agencies. Populating the form(s) involves entering values into the form(s), responding to inquiries on the form(s), or other data entry-type functions. Populating the form(s) may include entering partial information into the form(s), entering all known information into the form(s), completing the form(s), etc. Filing the form(s) involves the process of sending the form(s) to the appropriate entity and all processes related to sending the form(s) (e.g., making a copy of the form(s), addressing the correspondence, applying postage, configuring a computing device to electronically submit the form(s), submitting the form(s) electronically, etc.).

In one or more embodiments of the invention, the software package (105) includes pre-existing, pre-constructed completion processes. More specifically, in one or more embodiments of the invention, the software package (105) is configured to store pre-constructed completion processes that correspond to one or more completion options chosen by the user (120). Alternatively, in one or more embodiments of the invention, the software package (105) may be configured to generate/construct completion processes dynamically. In one embodiment of the invention, the completion process may be a part of the software package (105), where the completion process is a portion of a package of activities performed by the software. The package of activities may include, but is not limited to automatically populating forms based on user input, sending form drafts to the user, automatically checking and correcting errors in forms, electronically filing the forms, etc.

In one or more embodiments of the invention, the software package (105) being used by a user (120) for a completion process may be any software that guides, aids, or automatically completes the financial completion process on behalf of a user. For example, in the case where the forms are financial forms, the software package (105) may be a financial software package such as TurboTax® (TurboTax is a registered trademark of Intuit, Inc., headquartered in Mountain View, Calif.).

In one or more embodiments of the invention, a completion process stored in the software package (105) may be a process made up of forms and queries presented to a user (120) in a particular format. More specifically, in one or more embodiments of the invention, a completion process includes a pre-determined order of forms and a pre-determined order and phrasing of queries that are presented to the user during the completion process. In one or more embodiments of the invention, the pre-determined order and phrasing of queries and forms is based a user's chosen completion option (described below). Further, in one or more embodiments of the invention, a completion process includes help boxes, dialog boxes, and other guidance tools that may be presented to a user while the user is working through the completion process. Thus, the completion process determines the content and appearance of forms, queries, help/dialog boxes and other user interface components based on a selected completion option.

In one or more embodiments of the invention, a completion option represents a method for populating a completion process. Said another way, a completion option is an option selected by a user that represents how the user would like the software package (105) to present (i.e., display) a completion process. In addition, as mentioned above, a completion option determines the format of a completion process. For example, a completion option may be a paper filing, a professional filing, a new filing, or a software filing. A paper filing is a manual filing, where a user fills out forms using paper and a pencil/pen. If a chosen completion option is a paper filing, then the software package (105) presents the completion process as a paper filing would be presented to a user (i.e., the user interface and tools used by the user may appear as they would in a paper filing). A new filing relates to a first-time filing, where the user has never filed any type of forms previously. A software filing refers to a filing in which a user used a software to electronically file forms. Finally, a professional filing a is a filing in which a user hires a professional service that files forms on the user's behalf, such as an accountant that files the user's tax forms or other professional service/organization.

Further, in one embodiment of the invention, a user's previous completion option may be a completion option used in the last calendar year, the last time any type of forms were populated and filed by a user, or any other time frame during which the user had experience with a previous completion option. In one embodiment of the invention, the completion option is related to filing tax documents with various government bodies, where the user may be one that filed taxes in a previous financial year using a paper filing method, a tax software filing method, hired a professional tax service, such as H&R Block to file the user's taxes on his/her behalf, or a user that has never filed taxes previously.

Continuing with FIG. 1, in one or more embodiments of the invention, various types of users (120) may use the software package (105) to populate or work through the completion process. In one or more embodiments of the invention, the user (120) may be one that previously used a different method for populating the completion process. For example, the user may be one that previously used a manual (i.e., pencil and paper) completion option, a completion option that involved a different software product than the one currently being used, a completion option involving a professional service that completes the completion process on the user's behalf, a completion option that involves using the same software product currently being used, or a user that has never completed a financial completion process previously (i.e., a first-time user).

Those skilled in the art will appreciate that a user (120) may be an individual, a family, a corporation, or any other group of people that may populate and file forms with entities or government agencies.

In one embodiment of the invention, the form repository (110) is a repository configured to store forms, such as tax forms, insurance forms, healthcare/medical forms, accounting forms, inventory forms, business organization forms, and other type of forms that require a specifically formatted output or specific content. For example, in one embodiment of the invention, the form repository (110) may include Internal Revenue Service (IRS) tax forms such as mortgage forms, 1040 forms, employment forms (i.e., such as a W2), etc. Further, the form repository (110) may include insurance claim forms, forms related to creating an incorporated business entity, healthcare eligibility forms, new patient forms to be filled out for healthcare institutions, such as hospitals, etc. In one embodiment of the invention, one or more of the forms in the form repository (110) may be related to each other. That is, a particular form may be dependent on the completion of another form, in which case the forms are related to each other. Alternatively, in one embodiment of the invention, there may be one or more sections of a form that relate to another form.

In one or more embodiments of the invention, the completion process generator (125) is configured to select a financial completion process stored in the financial software package (105) for a current completion option based on a user's previous completion option. More specifically, the completion process generator (125) includes functionality to receive user input specifying the user's previously used completion option and choose the completion process from the software package (105) that is presented to a user in a current completion option. As described above, the completion process includes a customized format of the forms, queries, and user interface tools that may be presented to the user (120).

Figure 2:
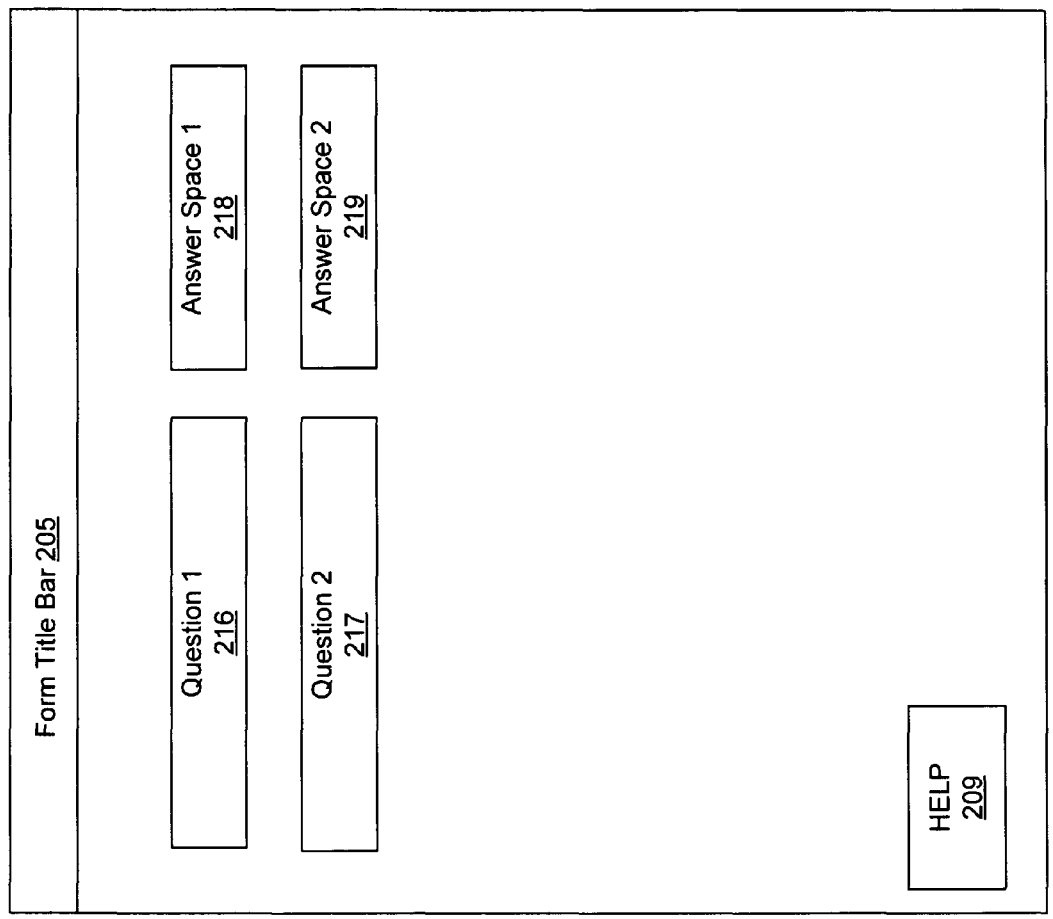
FIG. 2 shows a user interface in accordance with one or more embodiments of the invention.

FIG. 2 shows a user interface (200) for viewing and populating forms presented in a completion process in accordance with one or more embodiments of the invention. In one embodiment of the invention, the user interface (200) of FIG.

2 is presented by a software being used by the user to complete a completion process. Thus, the user interface (200) is part of the completion process. Specifically, FIG. 2 shows a user interface (200) including a form title bar (205), questions (i.e., Question 1 (216), Question 2 (217)) and answers (i.e., Answer Space 1 (218), Answer Space 2 (219)), and a help (209) option. Each of the aforementioned components of the user interface (200) are described below.

The form title bar (205) displays the name/title of one or more forms that are presented to a user in the completion process. As described above, a user may answer one or more queries/questions (i.e., Question 1 (216), Question 2 (217)) during a completion process. For example, the questions presented to a user during a completion process including financial forms may be financial interview questions. The user interface (200) allows the user to view and answer the questions (i.e., Question 1 (216), Question 2 (217)) in the order that they are presented by the software. Further, each question (i.e., Question 1 (216), Question 2 (217)) is associated with a corresponding answer space (i.e., Answer Space 1 (218), Answer Space 2 (219)) for answering the questions.

In one or more embodiments of the invention, questions (i.e., Question 1 (216), Question 2 (217)) may be queries that ask for financially-related information from a user (i.e., financial interview questions). The answers to the financial interview questions may then be used to populate one or more financial forms. For example, financial interview questions may be related to a user's salary information, employment information, mortgage information, family unit information (e.g., marital status, dependents/no dependents, etc.), rental property information, home office/home business information, healthcare information, etc. More specifically, financial interview questions are presented to a user as part of the financial completion process so that the user does not have to read and understand the actual financial forms (which may be complicated and difficult to understand). Said another way, the financial interview questions are a tool used to simplify the financial completion process for the user. As described above, in one or more embodiments of the invention, the order and format of the financial interview questions may depend on the user's previous completion option experience and the user's currently selected completion option.

In one or more embodiments of the invention, questions (i.e., Question 1 (216), Question 2 (217)) may be related to non-financial information. For example, consider the scenario in which a new patient makes an appointment to see a healthcare professional (e.g., doctor, dentist, specialist, etc.). Typically, all new patient forms for a particular type of healthcare professional service require similar basic information from the new patient. In this case, embodiments of the present invention may be used to obtain new patient information by asking queries to the new patient. Such queries may be related to the new patient's basic contact information, previous surgery procedures performed on the new patient, previous medicines taken, allergy information, previous diagnoses for any diseases or conditions, etc. Thus, in one or more embodiments of the invention, questions and forms may be related to collecting information from a user for any process that requires specific information or has a specified output.

Those skilled in the art will appreciate that while the user interface (200) shows the questions and answers fields adjacent to each other, there may be other ways in which to display questions and receive a user's answer via a user interface. For example, the user interface may present a questions where the corresponding answer space is below the question. Alternatively, questions may be presented one at a time.

In one embodiment of the invention, rather than asking queries, the user interface (200) may directly present one or more forms to the user, depending on the user's previous completion option experience and the user's currently selected completion option. Those skilled in the art will appreciate that the user may be presented with the actual form or a simplified version of the form, where the form's appearance is representative of the actual form. For example, a user that has used the current software before, and chooses the current completion option as a software filing, may be presented with actual forms to populate. On the other hand, a first-time user that has never previously completed a completion process may be presented with easy-to-answer, basic queries. The software may then use the user's answers to the queries to populate one or more forms on behalf of the user. Thus, the format of the completion process is customized via the user interface (200) presented to the user, based on both the user's previous completion process experience and the currently selected completion option.

While answering queries, a user may need help. In this case, the user may use the help (209) option provided within the user interface (200) to receive instructions, see an example of a particular section of a form, where the section of the form is populated, conduct a live chat via a messaging service to ask specific questions to a support professional, or obtain other types of guidance while working through a completion process. The help (209) option may be a button that launches a website or menu of help services offered, a button that launches a messing service, a link that provides a user with help options, a drop-down or pull-up menu, or any other type of graphical interface option that can be selected by a user.

As mentioned above, for each type of user that may be using a software package to complete a completion process, the user may be accustomed to a particular completion process based on the previous completion option chosen by the user (or based on never having chosen a completion option). For example, a user that previously used a paper filing completion option to file tax forms may expect to begin the completion process presented by the software with financial questions (or sections of a tax form) related to income derived from the user's salary (i.e., general income questions). In contrast, a user that previously used a software filing completion option may expect to begin the completion process with questions related to the financial events that have occurred in the user's life since the last time tax forms were filed by the user (e.g., did the user buy a home within the last financial year, did the user have a baby within the last financial year, etc).

In addition, for users who have used the software filing completion option previously, some of the user's data may be carried over from the electronic records or stored by the software so that some portions of the completion process may be skipped for repeat software filing users. For a user that previously used a paper filing completion option, portions of the financial completion process may not be skipped. Thus, embodiments of the invention customize the completion process provided in a current completion option by taking into account the user's experience with a previous completion option. Said another way, the completion process presented to the user is formatted according to the previous completion option used by the user.

Figure 3:
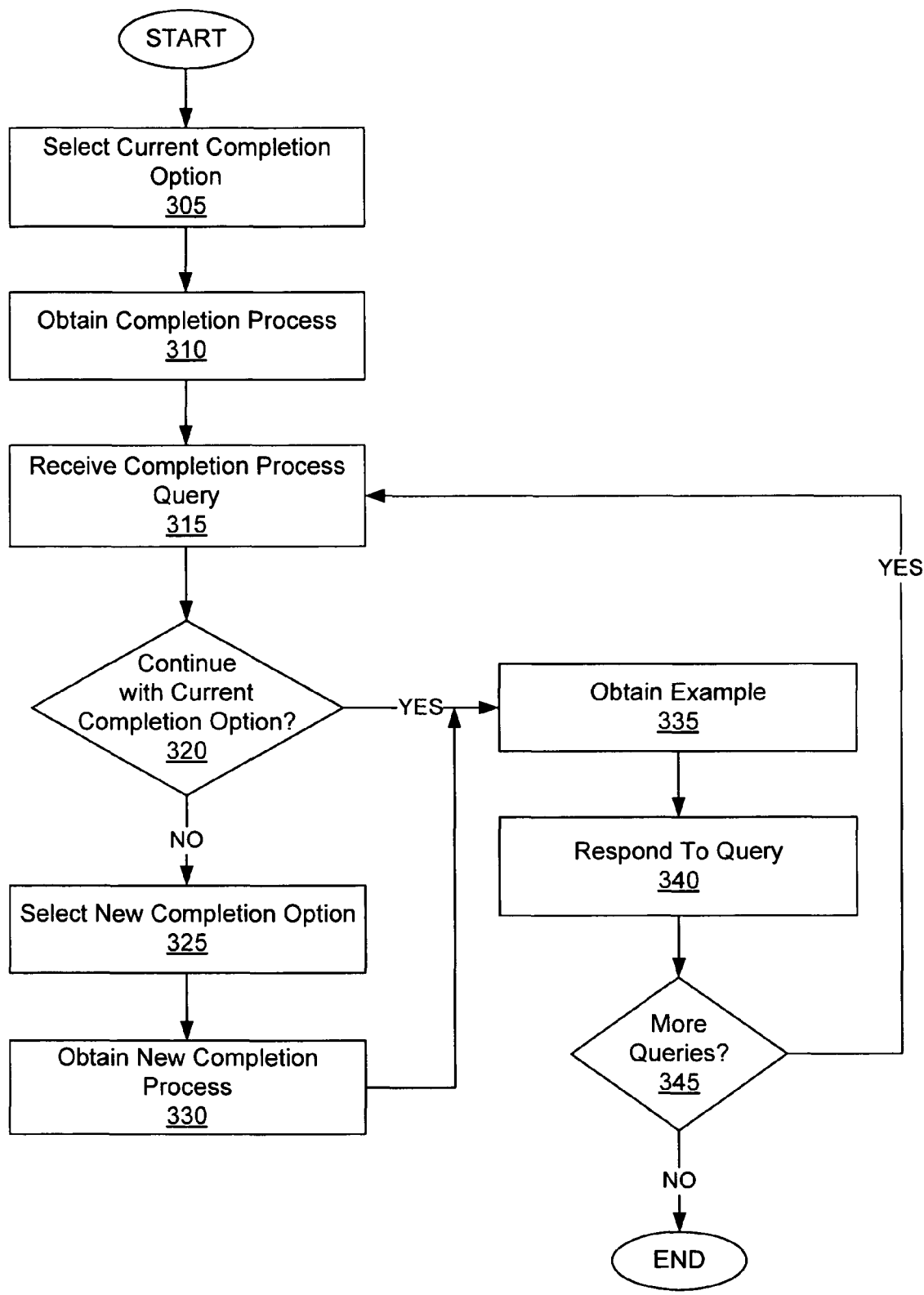
FIG. 3 shows a flow chart in accordance with one or more embodiments of the invention.

FIG. 3 shows a flow chart for populating a form based on an existing format in accordance with one or more embodiments of the invention. Initially, the user selects a completion option to populate the form (Step 305). That is, a user selects whether the completion option presented by the software is a paper filing completion option, a software filing completion option, a new filing completion option, or a professional filing completion option. For example, in one embodiment of the invention, if a user used a paper filing completion option previously, then the user may wish to continue with a paper filing completion option in the currently selected completion option. Alternatively, if the user decides that the previous experience with a paper filing completion process was undesirable or the user wishes to attempt using a different completion option, then the selected completion option may be a software filing completion option.

Subsequently, a completion process based on the selected current completion option is obtained (Step 310). As described above, a completion process involves viewing forms using a user interface, sending data, receiving and responding to queries, and obtaining help/support to answer queries. More specifically, in one or more embodiments of the invention, the completion process is selected from several pre-constructed completion processes stored in a software package after the user specifies a current completion option (i.e., at runtime) and is presented to the user in Step 310. Thus, the format of the selected completion process matches the completion option chosen by the user. Alternatively, in one or more embodiments of the invention, a completion process may be dynamically created after a user chooses a completion option. That is, a completion process, including an ordered selection of forms, an order and phrasing of queries, an appearance and content for help options presented to the user, etc., may be constructed on-the-fly within a software package based on the user's chosen completion option. In this case, the software package may obtain the user's input regarding a chosen completion option and subsequently generate a completion process to present to the user at runtime.

Particularly, in one or more embodiments of the invention, a user selects a completion option based on the method for form completion used in a previous year. More specifically, suppose the user's previous completion option was a paper filing in the last calendar year. Suppose further that the user grew accustomed to the format of the paper filing completion option and continues to expect the completion process to be similar to the paper filing completion option. Based on this information, the user selects a paper filing completion option as the current completion option presented by the software. In this case, the software presents a completion process (in Step 310) that is similar (e.g., has the same or similar look, same or similar order of questions, etc.) to the paper filing completion option. Alternatively, the completion process may have a different look, but may include the same content that is required for the population of one or more forms. For example, simplified versions of forms may be presented to the user based on a selected completion option, where the content obtained from the user is the same as the original, more complicated forms, but the process of obtain the content is made easier by the simplified versions of the forms.

In another example, consider the scenario in which a user previously used a paper filing completion option, but no longer wishes to continue using a paper filing completion option. In this case, the user may select a software filing completion option. In this case, the selected/constructed completion process presented by the software package may be based on the format of a typical software filing completion option.

Continuing with FIG. 3, subsequently, a completion process query is received (Step 315). As described above, a completion process query may be an interview question, a field requiring an answer to the interview question, and/or one or more forms, depending on the current completion option chosen by the user. In one embodiment of the invention, the query received by the user is based on the completion option selected by the user. That is, because the order and structure of queries depends on the completion option selected by a user, the query received by a user using a paper filing completion option may be different from the query received by a user using a financial software filing completion option. In particular, both the phrasing of the query and the order of the query may differ based on the selected completion option.

At this stage, before the query is responded to by the user, a determination is made whether to continue with the current completion option (Step 320). More specifically, in one or more embodiments of the invention, a user may change to a different completion option at any time after being presented with a financial completion process. For example, the user may decide that a particular portion of questions (or the current query) or section of a form (e.g., questions or a section of a tax form related to capital gains) is unclear or may simply prefer a different format for continuing with the particular portion of questions or section(s) of a form. In this case, the user may decide to change the current completion option.

If the user decides to change the current completion option before answering the received query, a new completion option is selected (325), and a new completion process based on the new completion option is obtained (Step 330). That is, a completion process corresponding to the new completion option is selected within (or constructed by) the software package. Subsequently, the newly selected completion process is presented to the user. In one embodiment of the invention, the newly selected/constructed completion process picks up where the previous financial completion process left off. Said another way, the completion process corresponding to the new completion option may present the next step that the user expects based on the previous completion process.

Those skilled in the art will appreciate that the next step presented to the user may be different from the next step in the previous completion option, because the format (e.g., order of forms and/or queries) of the new completion process may be different from the format of the previous completion process. In one or more embodiments of the invention, the newly selected/constructed completion process may recognize the portions of the completion process that the user has already completed. In this case, the user may either navigate manually in the newly selected completion process to populate the portion of the completion process that was formatted undesirably in the previous completion process, or may be guided along a new path.

For example, suppose the financial interview questions related to capital gains are formatted unfamiliarly in the current completion process. In this case, the user may change the completion option selection to a new filing completion option for the portion of financial interview questions/section of the financial form that relate to capital gains. With a new filing completion option, the user may obtain additional help boxes or may have a live chat with a financial professional to better understand this portion of the completion process. Those skilled in the art will appreciate that a user may continue using the new completion option for the remainder of the completion process, or revert to the previous completion option upon populating the one or more portions of the completion process that were originally unclear to the user.

Continuing with FIG. 3, alternatively, if the user does not wish to change to a different completion option after receiving a particular query, help may be obtained (Step 335). In addition, help may be obtained while the user works through the newly selected completion option (i.e., after Step 330). As described above, obtaining help to answer a particular financial query or group of queries may involve conducting a live chat with a professional, obtaining an example including a sample answer to a query or a populated section of a form, obtaining further instructions regarding what particular terms/phrases within the received query mean, etc. Upon obtaining help, the user responds to the received query (Step 340). Those skilled in the art will appreciate that using the help features/dialogue boxes is optional based on the skill of the user. Finally, if more queries remain to be answered in the completion process (Step 345), then Steps 315-345 are repeated for each remaining query. Alternatively, when all the queries presented by the completion process have been answered, the process ends.

Figure 4:
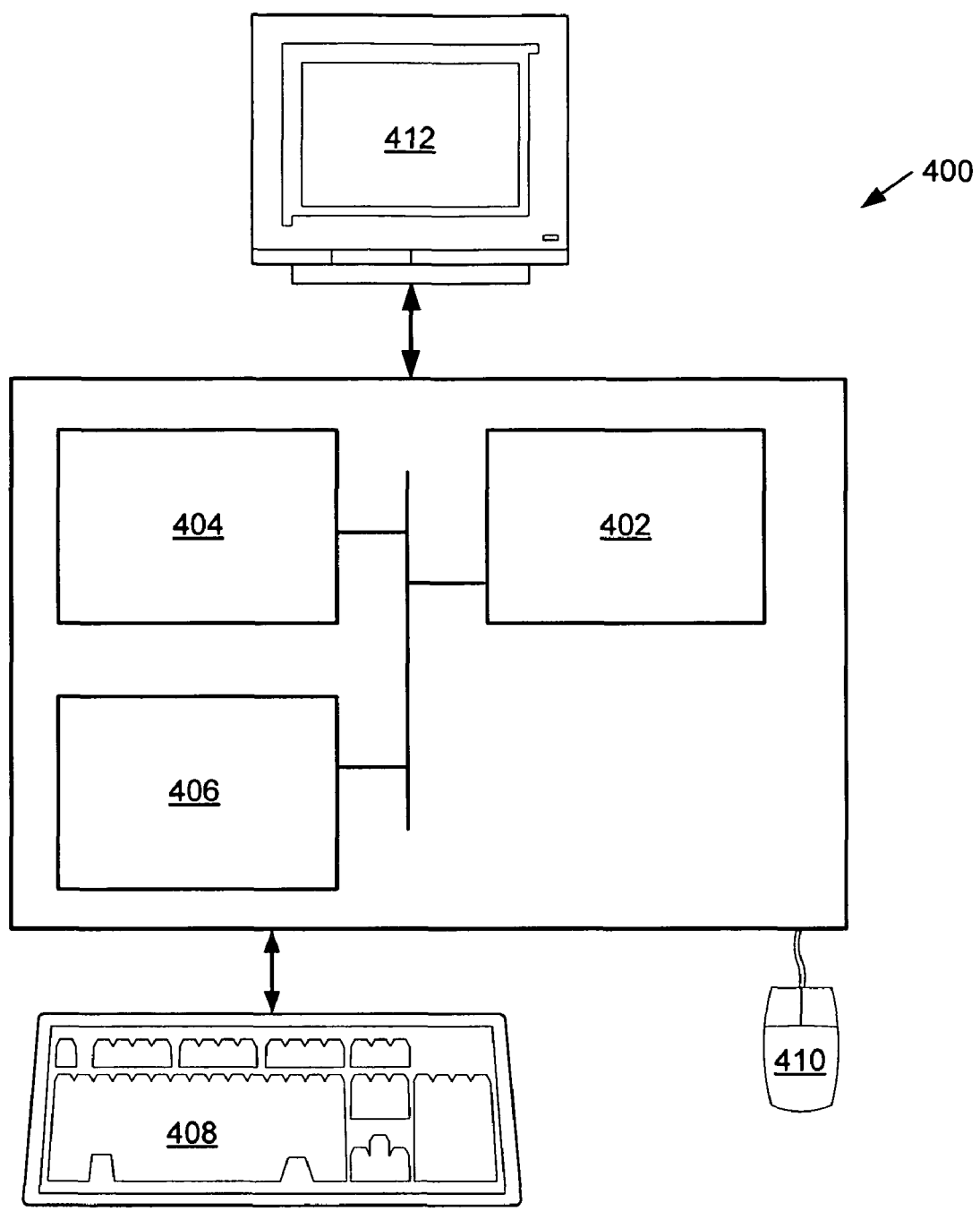
FIG. 4 shows a computer system in accordance with one or more embodiments of the invention.

The invention may be implemented on virtually any type of computing device (e.g., a mobile device, a media device, a personal digital assistant, etc.) regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., the completion process generator, the user interface, the software package or software product, etc.) may be located on a different node within the distributed system. In one embodiment of the invention, the node corresponds to a computing device. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a method for customizing a form filing process presented to a user by a software product or package based on the user's previous filing experiences. Examining a user's previous method of completing and/or filing forms provides for an interview process that has greater accuracy, increased user satisfaction and convenience. In this manner, a user can follow the same order of steps that were followed in previous form filing experiences, making the form filing process more familiar to the user. Further, the user can choose to change the completion process during a particular selected completion process, if the user does not like the manner in which the originally selected completion process handles a particular portion of the form filing process.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of populating at least one form of a plurality of forms comprising:
    selecting a current completion option to display a first completion process in a first format for the at least one form;
    obtaining the first completion process in the first format based on the current completion option;
    receiving a first query of a first plurality of queries based on the first completion process of the current completion option;
    selecting, in response to receiving the first query, a new completion option to display a second completion process in a second format for the at least one form;
    obtaining the second completion process in the second format based on the new completion option;
    receiving a second query of a second plurality of queries based on the second completion process of the new completion option; and
    populating the at least one form of the plurality of forms using the second completion process,
    wherein the first and second formats each have distinct content and appearance for the at least one form of the plurality of forms.

2. The method of claim 1, wherein the at least one form is one selected from a group consisting of a tax form, a healthcare form, an insurance form, a claim form, and a support form.

3. The method of claim 1, wherein the new completion option is selected from a software package.

4. The method of claim 3, wherein the software package is configured to store a plurality of pre-constructed completion processes for selection.

5. The method of claim 3, wherein the software package is configured to dynamically construct the first completion process based on the current completion option selected by a user.

6. The method of claim 1, wherein the first completion process comprises:
    an example answer to a query and an example of a populated section of the at least one form based on the current completion option.

7. The method of claim 1, wherein the first completion process comprises:
    a user interface based on the current completion option.

8. The method of claim 1, wherein at least two of the second plurality of queries are ordered based on the new completion option.

9. The method of claim 1, wherein the current completion option comprises at least one selected from a group consisting of a paper filing, a professional filing, a new filing, and a software filing.

10. The method of claim 1, wherein using the second completion process comprises sending financial data.

11. A non-transitory computer readable medium storing instructions to populate at least one form of a plurality of forms, the instructions comprising functionality to:
    select a current completion option to display a first completion process in a first format for the at least one form;
    obtain the first completion process in the first format based on the current completion option;
    receive a first query of a first plurality of queries based on the first completion process of the current completion option;
    select, in response to receiving the first query, a new completion option to display a second completion process in a second format for the at least one form;

obtain the second completion process in the second format based on the new completion option;

receive a second query of a second plurality of queries based on the second completion process of the new completion option; and populate the at least one form of the plurality of forms using the second completion process, wherein the first and second formats each have distinct content and appearance for the at least one form of the plurality of forms.

12. The non-transitory computer readable medium of claim 11, wherein the at least one form is one selected from the group consisting of a tax form, a healthcare form, an insurance form, and a support form.

13. The non-transitory computer readable medium of claim 11, wherein the first completion process comprises an example answer to a query and an example of a populated section of the at least one form based on the current completion option.

14. The non-transitory computer readable medium of claim 11, wherein at least two of the second plurality of queries are ordered based on the new completion option.

15. The non-transitory computer readable medium of claim 11, wherein the current completion option comprises at least one selected from a group consisting of a paper filing, a professional filing, a new filing, and a software filing.

16. The non-transitory computer readable medium of claim 11, wherein the new completion option is selected from a software package.

17. The non-transitory computer readable medium of claim 16, wherein the software package is configured to store a plurality of pre-constructed completion processes for selection.

18. The non-transitory computer readable medium of claim 16, wherein the software package is configured to dynamically construct the first completion process based on the current completion option selected by a user.

19. A system for populating at least one form of a plurality of forms comprising:

memory to store instructions;

a processor to execute the instructions;

a software package executing on the processor and configured to:

obtain a current completion option selected by a user, wherein the current completion option displays a first completion process in a first format for the at least one form;

send, to the user, a first query of a first plurality of queries based on the first completion process of the current completion option;

obtain, in response to the first query sent to the user, a new completion option selected by the user, wherein the new completion option displays a second completion process in a second format for the at least one form;

send, to the user, a second query of a second plurality of queries based on the second completion process of the new completion option; and populate the at least one form of the plurality of forms using responses from the user using the second completion process;

a completion process generator executing on the processor and configured to:

generate the first completion process associated with the current completion option, wherein the first format of the first completion process is determined by the current completion option; and generate the second completion process associated with the new completion option, wherein the second format of the second completion process is determined by the new completion option; and a form repository operatively coupled to the software package and comprising the at least one form, wherein the first and second formats each have distinct content and appearance for the at least one form of the plurality of forms.

20. The system of claim 19, wherein the second completion process comprises at least one selected from a group consisting of an example associated with the completion option, a query associated with the completion option, a user interface associated with the completion option, and at least one section of the at least one form presented by the completion process.

21. The system of claim 19, wherein the at least one form is one selected from the group consisting of a tax form, a healthcare form, an insurance form, and a support form.

22. The system of claim 19, wherein the software package is configured to store a plurality of pre-constructed completion processes for selection.

23. The system of claim 19, wherein the software package is configured to dynamically construct the second completion process based on the new completion option selected by the user.

* * * * *